United States Patent

[11] 3,611,022

[72] Inventor Wayne F. Galusha
Reeds Ferry, N.H.
[21] Appl. No. 855,605
[22] Filed Sept. 5, 1969
[45] Patented Oct. 5, 1971
[73] Assignee Sanders Associates, Inc.
Nashua, N.H.

[54] POWER CONTROL CIRCUIT
10 Claims, 4 Drawing Figs.

[52] U.S. Cl. .......... 315/320, 307/284, 315/169 R
[51] Int. Cl. .......... H05b 37/00
[50] Field of Search .......... 307/284; 313/108; 315/168, 169, 209, 320

[56] References Cited
UNITED STATES PATENTS
3,371,230 2/1968 Blank et al. .......... 315/169 X

*Primary Examiner*—Raymond F. Hossfeld
*Attorney*—Louis Etlinger

ABSTRACT: A power control system incorporating a silicon-controlled rectifier for selectively applying electrical power to an electroluminescent device so as to cause illumination thereof. The silicon-controlled rectifier is selectively switched between its nonconducting and conducting state by a controlled bilevel signal applied to the cathode and by selectively controlling the bias values, the silicon-controlled rectifier will have a 360° conduction angle thereby applying maximum power to the electroluminescent device.

INVENTOR.
WAYNE F. GALUSHA
BY
ATTORNEY

INVENTOR.
WAYNE F. GALUSHA
BY [signature]
ATTORNEY

POWER CONTROL CIRCUIT

FIELD OF THE INVENTION

The present invention relates to control circuits, more particularly, to control circuits for selectively applying high electrical energy to electroluminescent display devices.

PRIOR ART

An electroluminescent display device exhibits the electrical characteristics of a capacitor or a high-impedance load. Therefore, to achieve optimum illumination of the display devices, the control circuits must efficiently deliver high voltages at low current to properly excite the phosphor material in the device.

Techniques of electronic switching and control circuits for electroluminescent display devices are well known. Unfortunately, all prior art techniques relating to these circuits exhibit disadvantages in areas relating to (a) cost and/or (b) physical size of the control circuits. For example, simple transistor power control circuits are unsatisfactory for electroluminescent applications because they do not exhibit the necessary bidirectional switching capabilities. Although complex transistor power control circuits may have bidirectional switching capabilities they need many other circuit components thereby affecting both the cost of and the physical size of the system.

Examples of other types of power control circuits in electroluminescent applications are circuits which incorporate a reed switch or a saturable inductor. However, neither circuit is a complete solid state unit, and is therefore impractical, if not unacceptable, in systems where physical size is important. In particular, for the reed switch systems, the reed switch provides the necessary ON gate signal, and a permanent magnet provides the storage function; that is, to assure that the ON signals is applied for the required time. In designing the reed switch control circuit it is necessary to isolate the magnet from the reed switch to assure that the electric field associated with the magnet will not affect the operation of the reed switch. It is thus seen that the reed switch system is, comparatively speaking, large in both size and weight. An alternative component for the magnet is a complex circuit designed to keep the reed contacts closed for the designated time which then adversely affects the cost factor.

The basic saturable inductor systems are designed to operate in either of two stable states, and it will remain in either of the two states until controlled signal switches it to the other state. Again, the critical factors of physical size and cost considerations prevent the use of the inductor control circuits in electroluminescent applications.

Other switching circuit systems have incorporated a silicon-controlled rectifier called a Triac which is a bidirectional switching device. The primary limitation of the use of a Triac rectifier is the cost factor, for at the present time the Triac SCR is considerably more expensive than a silicon-controlled rectifier. For as previously mentioned, the cost factor becomes very important when multiple display units are to be built, since each display must have its own control circuit.

SUMMARY OF THE INVENTION

Accordingly, it is a primary object of this invention to provide a novel and improved control circuit;

An additional object of this invention is to provide a solid state control circuit that is inexpensive to build, and whose physical size is maintained at a minimum because a system or a multiple of systems only requires a minimum of components;

It is a further object of this invention to provide an electroluminescent panel drive circuit and switch in which the power factor and power dissipated characteristics are favorable to a source having low power requirements because substantially all of the power is developed across the electroluminescent panel and not absorbed by other components;

Another important object of this invention is to provide an electroluminescent panel control circuit which incorporates a silicon-controlled rectifier that conducts over a 360° conduction angle thereby providing a system which supplies a maximum amount of power to the device;

A further object of this invention is to provide a contactless electroluminescent panel switching circuit which incorporates a silicon-controlled rectifier and which circuit exhibits bidirectional switching capabilities to properly illuminate and turn off display panels.

According to this invention, this and other objects which will become apparent upon reading the specification are embodied in apparatus comprising a control circuit assembly which includes a cathode-controlled silicon-controlled rectifier capable of being selectively switched between a conducting and nonconducting state. When a controlled signal switches the rectifier to its conducting state, a source of load current then transmits load current through the rectifier and a low-impedance return path. The low-impedance return path assures that a substantial amount of power is developed across the load and only a limited amount of power is absorbed by the control circuit and return path.

BRIEF DESCRIPTION OF THE DRAWINGS

For a clearer understanding and appreciation of the invention, reference may be made to the following detailed description and accompanying drawings, in which.

DETAILED DESCRIPTION OF THE PREFERRED EMBODIMENT

Figure 1:
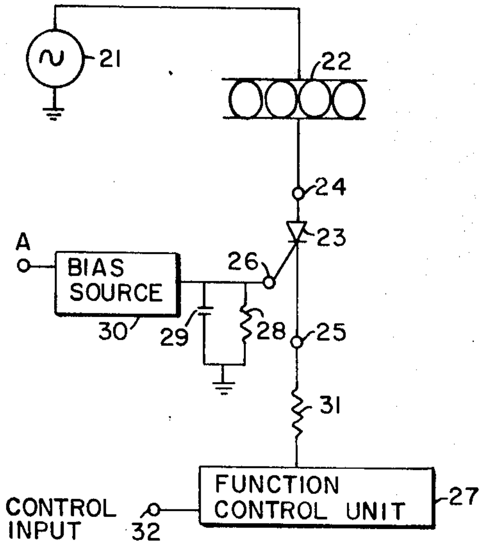
FIG. 1 is a schematic representation of a power source, an electroluminescent device, and its associated power control switching circuit.
Figure 3:
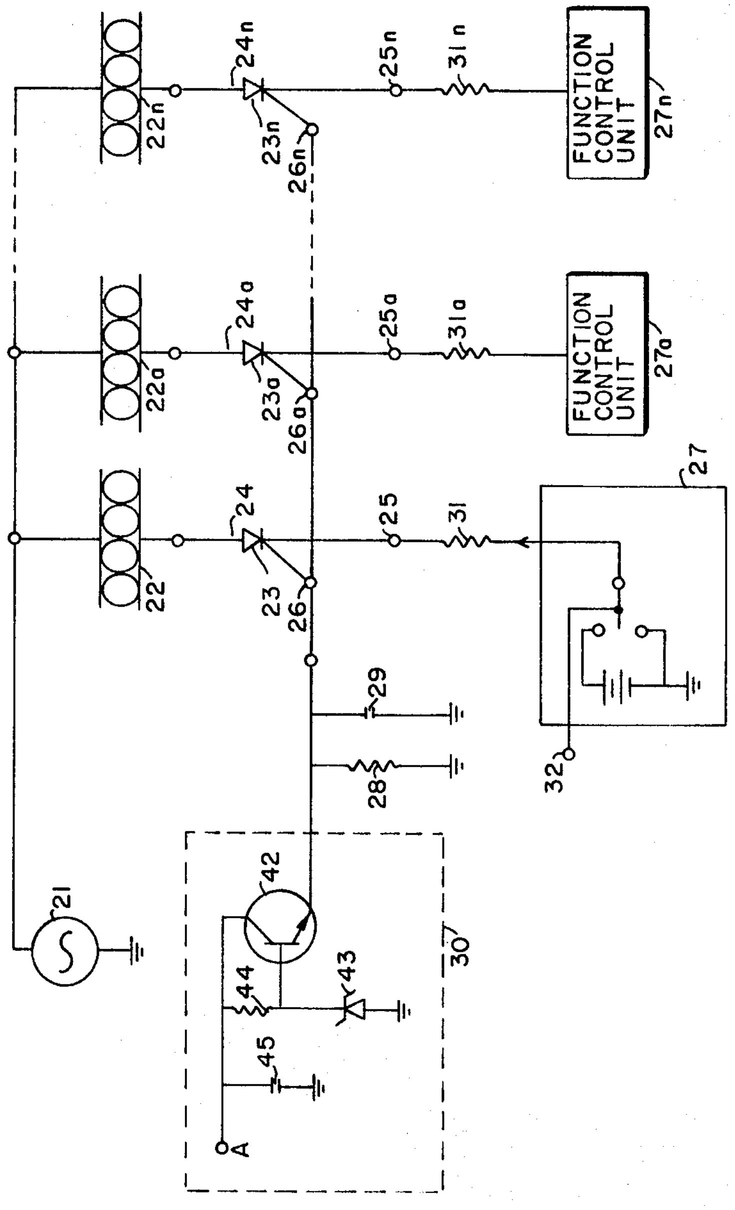
FIG. 3 is a schematic representation showing a plurality of electroluminescent panels with each panel being connected to its respective control circuit.

A power circuit embodying the invention is illustrated in FIGS. 1 and 3, and includes a silicon-controlled rectifier 23 (hereinafter designated as SCR) which selectively switches between a conducting and nonconducting state and a function control unit 27 connected to cathode 25 of the SCR 23. The function control unit 27 is a device which provides a controlled bilevel output signal. One of the two values of the output signal will cause the SCR 23 to be in its conducting state, and at this time electrical power from a power source will be applied to a load.

Referring now to FIG. 1 of the drawings, SCR 23 is shown to include an anode 24, a cathode 25 and a gate 26. The anode 24 is connected to one terminal of an electroluminescent device 22, the other terminal of which is connected to one terminal of a power source 21, for example, an AC power source. The other terminal of source 21 is connected to a suitable point of reference potential, illustrated in FIG. 1 as circuit ground. Cathode 25 is connected to one terminal of a bias resistor 31, the other terminal of which is connected to function control unit 27. The function control unit 27 may be any suitable switching circuit which provides an output voltage having either one of two voltage values, such as a simple switch, a logic device, field-effect devices, and other similar devices. Preferably unit 27 takes the form of a logic gate, as for example a DTL (diode-transistor logic) or a TTL (Transistor-Transistor logic) unit, which is operable from a supply voltage of about 5 volts. Such a logic circuit is controllably switched by a bilevel control signal applied to terminal 32 of unit 27, more particularly to provide a relatively high level output voltage (approximately 5 volts) when the control signal is at a low voltage level and to provide a relatively low level output voltage (approximately 0 plus volts) when the control signal is at a relatively high level. Gate 26 is connected to one terminal of a parallel circuit comprising a resistor 28 and a capacitor 29, the other terminal of which is connected to ground. In addition, gate 26 is connected to one terminal of a bias circuit 30, the other terminal of which is connected to the supply voltage which also supplied terminal 32 of function control unit 27. In addition, bias source 30 and the function control unit 27 have one of their terminals connected to a suitable point of reference potential, illustrated in FIG. 1 as circuit ground.

A feature embodied in the present invention is to interconnect the function control unit 27 to the cathode 25 of the SCR 23. The important distinction between applying the SCR 23 control signal to the cathode 25 or the gate 26 relates to the conduction angle of the SCR 23. When the control signal is applied to the gate terminal of the SCR, the SCR is in its conduction state for one-half of the voltage cycle (or positive current) appearing at the anode 24 or a maximum conduction angle of 180°. The cathode controlled SCR, however, will conduct for a full cycle of the supply voltage, or a conduction angle of 360° as will be subsequently explained.

Furthermore, a cathode controlled SCR presents itself to certain advantages in designing a circuit, for example, a multiple of individually controlled SCR's may be connected to one common bias source, or permitting the use of a time shared (multiplex) system. This feature substantially reduces the cost of an operational system and enhances system performance; for example, any malfunction of one SCR unit will not affect the operation of the remaining SCR's or electroluminescent devices.

The system described in this application includes the power control circuit, the electroluminescent device 22, and the power source 21 all serially connected. Normally, SCR 23 is in its OFF or nonconducting state because of a relatively high voltage level (approximately 5 volts) being applied to the cathode 25 thereof from the function control unit 27. When an appropriate controlled signal, relatively high level, is applied to terminal 32 of unit 27, the output signal thereof applied to cathode 25 switches to a relatively low voltage level (approximately 0 volts). SCR 23 is then switched to its ON or conducting state. At this time, electrical power from source 21 is applied to the electroluminescent device 22 causing illumination thereof. The electrical power is removed from device 22 only when SCR 23 is switched to its OFF state, a condition caused by a relatively high signal being applied to cathode 25 when a relatively low signal is applied to terminal 32.

Figure 2A:
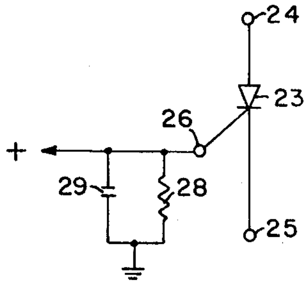
FIGS. 2A and 2B are schematic representations of the analagous circuit of a silicon-controlled rectifier in conjunction with the low-impedance return path, and the AC and DC signal paths of the silicon-controlled rectifier respectively.
Figure 2B:
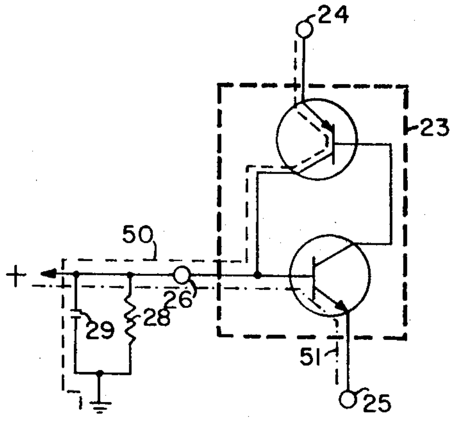

To more fully describe the operation of the cathode controlled SCR 23 embodied in this invention, and for purposes of explaining the 360° conduction angle of the SCR 23, reference will be made to FIGS. 2A and B. FIG. 2A is a schematic representation of the SCR 23, and further includes the gate connected parallel circuit comprising resistor 28 and capacitor 29. FIG. 2B is the equivalent of FIG. 2A, but with the SCR 23 represented by its transistor equivalent circuit, and further showing AC 50 and DC 51 current paths through the SCR 23 and the gate connected parallel circuit.

Considering first, the operation of a typical gate controlled SCR for which the conduction angle may be 180° or less. The SCR is a four layer semiconductor device having successive zones of PNPN conductive material and electrodes are connected to the outer zones, P-type and N-type, defined as the anode and cathode zones respectively and an electrode is connected to an intermediate zone, P-type, adjacent the cathode and defined as the gate. Further, the SCR may also be considered as a two transistor circuit, illustrated in FIG. 2B. The SCR is transformed to its ON or conducting state when the sum of the alphas (alpha 1 and alpha 2) equals one with alpha being the current gain through each of the PNP *and* NPN transistor sections. If a bias current is introduced into the gate of the SCR, the emitter current of the NPN transistor increases thereby increasing the values of alpha 1 and alpha 2 until the sum thereof equals one. The SCR will maintain its ON on conducting state providing the current through the cathode of the SCR is maintained above a minimum value called holding current. Additionally, when the SCR is in its conducting state, the removal of the gate signal will not turn off the device providing sufficient current is flowing through the anode to keep the sum of the two alphas equal to one; that is, if the anode current is greater than the maximum holding current value. Conversely, the SCR will switch to its off or nonconducting state when the anode current becomes less than the minimum holding current value. In AC current applications, the anode current automatically falls below the minimum holding current value at the end of each positive half cycle. For this reason the conduction angle of the gate controlled SCR is never greater than 180°.

In the embodiment described in this application, at least two factors affect or control the conduction angle of SCR 23. FIrst, SCR 23 switches between its conducting and nonconducting state by a selective control signal applied to the cathode 25, and a continuous DC bias current, from bias source 30, is applied to gate 26. In addition, the value of the DC bias current is selected to provide the best switching action of the SCR 23 and a value which also attains a full 360° conduction angle. As previously seen, the gate bias current directly affects the alphas of the SCR 23; that is, an increase in current at gate 26 causes the emitter current of the SCR 23 to increase and the sum of alpha 1 and alpha 2 also increases and approaches unity. It has been found that for a selected value of bias current, determined by the size of resistor 31, applied to the gate 26, the SCR 23 will conduct for both positive and negative (reverse) values of anodes current and, therefore, conducts for a full cycle of the anode signal or a conduction angle of 360°. It has been found that level of DC bias current must be sufficient to maintain the current through the cathode 25 above the minimum holding current even though the current at the anode 24 is negative in value.

A second factor that apparently affects the 360° conduction, and additionally contributes to the minimum power dissipation of the supply signal is the AC current or low-impedance return path. The AC current path through SCR 23 is from the anode 24, and through gate 26, not the cathode 25. The total AC current path begins with the source 21, through the electroluminescent device 22, the anode 24, the gate 26, and the parallel circuit comprising the resistor 28 and capacitor 29. This low-impedance path is determined by making resistor 28 much smaller than resistor 31. The power dissipation in the low-impedance path is maintained at a minimum and, therefore, a maximum amount of power is developed across the electroluminescent device 22.

Thus, it is known that the full 360° conduction angle of the SCR 23 is accomplished by 1) applying the control signal to he cathode 25, (2) by selecting the AC path to be from the anode 24 to the gate 26, and (3) by properly determining the value of the bias signal to be applied to the gate 26. By way of example only, the following components and voltage values have been found to operate satisfactorily in one of the units constructed according to this invention.

| | |
|---|---|
| SCR 23 | SSPI-AAI |
| Resistor 31 | 600 ohms |
| Resistor 28 | 25 ohms |
| Capacitor 29 | 100 microfarads |
| Control Unit 27 | Texas Instrument Co., I.C. SN 7474N |
| Source 21 | 200 volts RMS, 400 to 18 kHz. |
| Bias Voltage, gate 26 | 2.7 volts |
| Control Unit 27 | 1 state, 4-5 volts<br>0 state, 0 volts |

As previously stated, the degree of brightness of the electroluminescent device 22 is a function of the frequency and voltage applied across the device. Since the characteristic impedance of the electroluminescent device approximates a capacitor, the electroluminescent device combined with the low impedance AC signal path through the power control circuit assures that the majority of the voltage developed by source 21 is applied across the electroluminescent device; thereby providing excellent illumination with minimum power dissipation, or a more efficient device. Since the SCR 23 conducts for 360°, it also assures that the brightness level of the electroluminescent device 22 is optimum for a given frequency of operation and applied voltage.

The foregoing description has to this point dealt with only one electroluminescent device and its control circuit. Nevertheless, by using this same principle a multiple of electroluminescent devices 22 may be connected in parallel with the same supply source 21, illustrated in FIG. 3. Each electroluminescent device **22–22*n* is connected to an SCR 23–23*n* respectively, and each SCR 23–23*n* is controlled by its individual function control unit 27–27*n* and the gate 26–26*n* of each SCR 23–23*n* is connected in parallel to the bias source 30. This particular arrangement using only one bias source 30 permits the unit price for a system to be kept at a minimum. FIG. 3 also schematically illustrates a typical regulating circuit configuration for the bias source 30. The bias source 30 comprises a transistor 42, a bias resistor 44 connected between the base and collector of transistor 42, a zener diode 43 connected between the base of transistor 42 and a common reference potential, and a bypass capacitor 45 connected between the collector of transistor 42 and a common reference potential. Also a lead wire A is connected to the collector of transistor 42 through which the transistor operating voltage is applied. The operating voltage and the circuit parameters are appropriately selected so that the bias source 30 will apply a constant bias signal to gate 26 of SCR 23. As previously explained, the bias signal applied to gate 26 is selected to provide positive switching action of the SCR 23** between its conducting and nonconducting state.

The function control unit 27 illustrated in FIG. 3 includes a two position electrical switch and a voltage source across two terminals of the switch. The unit 26 is designed to provide a high-output signal level when the control signal has a low or zero voltage level, and unit 26 provides a relatively low or zero output voltage when the control signal applied to terminal 32 is at a relatively high level. Unit 27, illustrated in FIG. 3 is only shown for illustration purposes, and preferably unit 27 takes the form of a logic gate, as, for example, a DTL (diode-transistor logic) or a TTL (Transistor-transistor logic) unit.

It is to be understood that the above-described arrangements are by way of illustration only. The basic concept of the power control circuit may be used in conjunction with other type loads where bidirectional switching requirements, the degree of power dissipation, and the total power that is to be developed across the load are important requirements. Having thus described the invention, what is claimed as new and desired to be secured by Letters Patent is:

1. The combination comprising:
- a rectifier device capable of being switched between a conducting and a nonconducting state, said rectifier device having a first, a second, and a third electrode;
- a bias means connected to said second electrode;
- a load, a point of reference potential, and a source of load current all connected in series with said first electrode;
- a low impedance return path for said load current connected between said second electrode and said point of reference potential; and
- circuit means connected to said third electrode for rendering said rectifier device in said conducting and nonconducting states, said load current flowing through said load, said first and second rectifier electrodes and said low impedance when said rectifier device is in said conducting state.

2. The combination as defined in claim 1 wherein said rectifier device comprises a silicon-controlled rectifier, said first electrode being the anode electrode, said second electrode being the gate electrode, and said third electrode being the cathode electrode.

3. The combination as defined in claim 1 wherein said load comprises an electroluminescent device.

4. The combination as defined in claim 1 wherein said circuit means provides a first and a second signal, said rectifier device being in said conducting state when said first signal is applied to said third electrode.

5. A power control circuit as defined in claim 1 wherein
- said circuit means includes a resistive element, said resistive element being large compared to said low impedance path, said resistive element determining the value of bias current supplied by said bias means; and
- the value of said resistive element, said bias current, said low impedance path, and said first signal, being adjusted in concert to cause said rectifier to conduct a forward or reverse current appearing at said first electrode.

6. An electroluminescent display system, comprising:
- a source of load current having a first and second terminal;
- a point of reference potential, one of said terminals of said source being connected to said reference potential;
- at least a first electroluminescent device having a first and second connecting means, the other of said terminals of said source being connected to one of said connecting means;
- at least a first rectifier device having successive zones of PNPN conductive material, an input electrode connected to an end P zone, an output electrode connected to an opposite N zone, and a control electrode connected to an intermediate P zone, said input electrode being connected to the other of said electroluminescent device connecting means;
- bias means connected to said control electrode;
- a low-impedance return path for said load current connected across said control electrode and said reference potential; and
- at least a first function control means connected to said output electrode for rendering said rectifier device in said conducting and nonconducting states, said load current flowing through said load, said input electrode, said control electrode and said low-impedance return path when said rectifier device is in said conducting state.

7. The electroluminescent display system as defined in claim 6
- further includes a resistive element connected across said output electrode and said function control means, and said resistive element determines the bias current supplied by said bias means; and
- said function control means provides a first and a second signal, said rectifier device being in said conducting state when said first signal is applied to said resistive element.

8. The electroluminescent display system as defined in claim 7 wherein the values of said resistive element, said bias current, said low impedance path, and said first signal being adjusted to cause said rectifier to conduct both positive and negative currents appearing at said input electrode.

9. The electroluminescent display system as defined in claim 6 which includes a plurality of said electroluminescent devices, said rectifier devices and said function control means, wherein one of each of said devices, said rectifier devices and said function control means form a serially connected unit, and each of said serially connected units being connected in parallel to said load current source and said bias means.

10. The electroluminescent display system as defined in claim 6 wherein said rectifier device is a silicon-controlled rectifier.